July 17, 1928.
A. L. ALAJ
1,677,124
CUSHION TIRE
Filed May 27, 1927   2 Sheets-Sheet 1
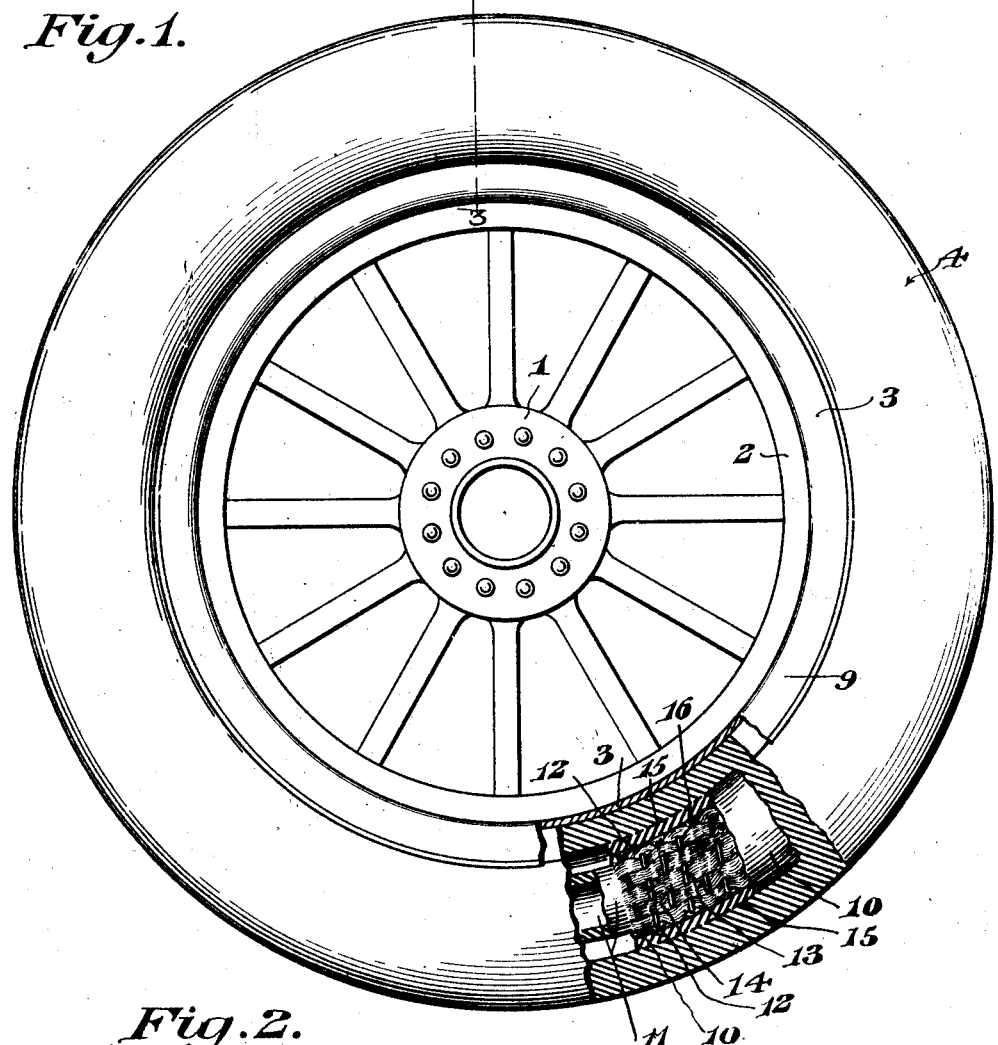
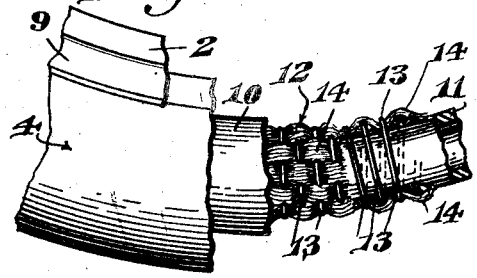
INVENTOR.
Antoine L. Alaj,
BY
Geo. P. Kimmel, ATTORNEY.

July 17, 1928.
A. L. ALAJ
CUSHION TIRE
Filed May 27, 1927    2 Sheets-Sheet 2
1,677,124
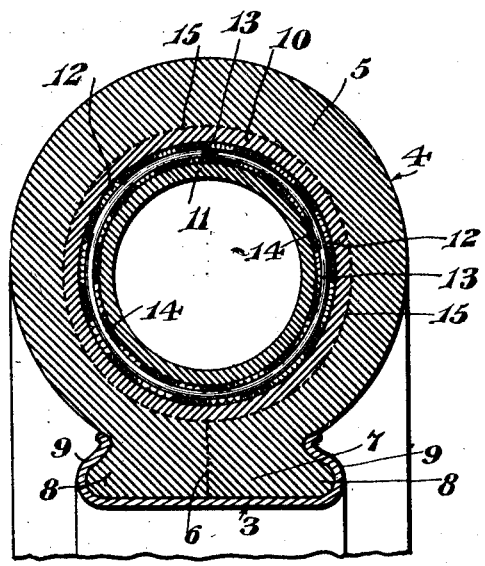
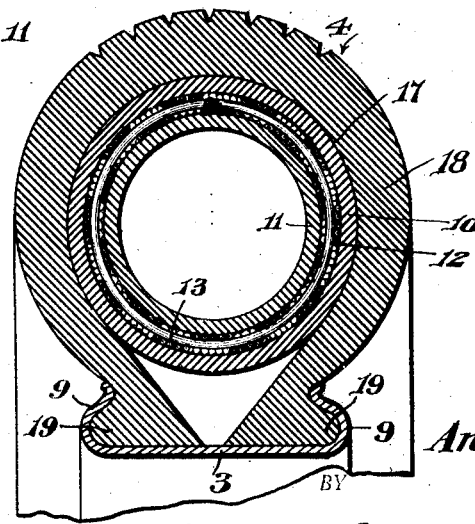
INVENTOR.
Antoine L. Alaj,
BY Geo. F. Kimmel.
ATTORNEY.

Patented July 17, 1928.

1,677,124

UNITED STATES PATENT OFFICE.

ANTOINE L. ALAJ, OF CHICAGO, ILLINOIS.

CUSHION TIRE.

Application filed May 27, 1927. Serial No. 194,740.

This invention relates to a new and improved cushion tire designed primarily for use with motor driven vehicles, but it is to be understood that a cushion tire, in accordance with this invention, can be employed in any connection for which it is found applicable, and the invention has for its object to provide, in a manner as hereinafter set forth, a cushion tire to be used as a thoroughly satisfactory substitute for the types of pneumatic tires now generally employed, and constructed in a manner to secure the desired resilient and cushioning effect present in a pneumatic tire without the employment of compressed air or other cushioning fluid.

Further objects of the invention are to provide, in a manner as hereinafter set forth, a cushion tire which is simple in its construction and arrangement, strong, durable, compact, thoroughly efficient in its use, conveniently installed with respect to a wheel rim, overcoming puncturing annoyances and blowouts, conveniently positioned on and removed from a wheel rim when occasion requires, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation illustrating a cushion tire in accordance with this invention and with a portion of the tire broken away to show the interior structure thereof.

Figure 2 is a fragmentary view, in side elevation, of a tire.

Figure 3 is a vertical section on line 3—3 Figure 1.

Figure 4 is a fragmentary view in longitudinal section.

Figure 5 is a vertical sectional view of a modified form.

A cushion tire, in accordance with this invention, can be employed in connection with any type of wheel including means for connecting the tire therewith, and by way of example a tire is illustrated and set up in connection with the wheel 1, including a felloe 2, carrying a rim 3 of the flanged or clincher type.

Referring to Figures 1, 2, 3 and 4 of the drawings, the cushion tire disclosed thereby is an integral composite structure comprising a core and a tread element, the latter forming a complete enclosure for the core. The tread element, referred to generally by the reference character 4, is what may be termed an outer shoe constructed of rubberized fabric similar to that of the casings or outer shoes now employed in pneumatic tires. The body portion 5 of the element 4 is hollow to provide an annular chamber of circular cross section having the wall thereof vulcanized to the core and the latter will be hereinafter more specifically referred to. When originally formed the element 4 is split, at the plane surface shown by dotted line at 6 to permit of positioning the core within the chamber formed by the element 4. When the core is vulcanized to the body portion 5 of the element 4, the split edges of the element are also vulcanized together. The inner side of the body portion 5 is extended, as indicated at 7 and further projected laterally in opposite directions to form oppositely disposed annular ribs 8 overlapped by the flanges 9 of the rim 3 for the purpose of connecting the tire in position on the rim 3. The body portion 5 of the element 4 gradually decreases in thickness from each side of the center of the outer portion of the tire to the extension 7 whereby the periphery of the tire will be slightly oval in cross section and further whereby the tread portion of the element 4 will be of greater thickness than the side portions thereof.

The core comprises an annular, resilient outer tube 10, an annular, resilient inner tube 11, an annular fabric tube 12 positioned between the inner and outer tubes 10, 11, an annular resilient member 13 in the form of a hollow annulus consisting of closely arranged, uniform coils formed from spring wire of the desired gauge, and cementitious material interposed between the tube 12 and the tube 10, between the tube 12 and the tube 11, and between the tube 12 and the coils of the member 13. The tube 12 is interlaced with the coils of the member 13 in a manner whereby each strand or thread 14 of the tube 12 will alternately overlap throughout the inner and outer faces of the coils of the member 13. The alternate overlapping of one thread or strand 14 will be staggered with respect to the alternate overlapping of adjacent strands or threads 14 with respect to the coils of the member 13. The tubes 10 and 11 are preferably constructed of rubber. After the core is mounted in the element 4 the outer tube 10 is vulcanized to the wall of the chamber formed by the element 4 and the split edges of the latter are also vulcanized together. The surface of vulcanization between the tube 10 and the element 4 is at the surface indicated by dotted line point 15. The material from which the tubes 10, 11 are formed is different from the rubberized fabric from which the element 4 is constructed under such conditions providing for greater resiliency for the tubes.

The securing of the fabric tube 12 to the tubes 10 and 11, by the cementitious material 16 prevents the circumferential shifting of the tube 12 relative to the tubes 10 and 11 and the interlacing of the tube 12 with the member 13 prevents the circumferential shifting thereof relative to the tubes 10 and 11. The core, in connection with the element 4, will secure the desired resiliency and cushioning effect as provided for by a pneumatic tire and the manner of constructing the core for the purpose referred to, dispenses with the employment of compressed air or other cushioning fluid.

In the form shown in Figure 5 the core which is indicated at 17 is constructed in the same manner as the core disclosed in Figures 1 to 4, but in the form shown in Figure 5 the core 17 is not vulcanized to the inner face of the outer shoe or tread element 18, and the latter is of the form now generally employed in pneumatic tires and consists of a split casing as is well known and formed with ribs 19, engaged by the flanges 9 of the tire 3.

It is thought the many advantages of a cushion tire, in accordance with this invention, owing to its strength and durability, as well as overcoming puncturing and blowout objections, can be readily understood, and although the preferred embodiment of the invention is as illustrated and described, yet it is to be understood that changes in the details of construction can be had which fall within the scope of the invention as claimed.

What I claim is:

1. In a cushion tire a core comprising a pair of resilient tubes one arranged within the other, a fabric tube interposed between said resilient tubes, and a hollow annulus in the form of closely arranged spring coils interlaced with the strands or threads of the fabric tube.

2. In a cushion tire a core comprising a pair of resilient tubes one arranged within the other, a fabric tube interposed between said resilient tubes, and a hollow annulus in the form of closely arranged spring coils interlaced with the strands or threads of the fabric tube, each strand or thread of the fabric tube alternately overlapping the outer and inner faces of said coils, the alternate overlapping of one of said strands or threads being staggered with respect to the overlapping of adjacent strands or threads.

In testimony whereof, I affix my signature hereto.

ANTOINE L. ALAJ.